United States Patent
Hattori (10) Patent No.: US 8,098,987 B2
(45) Date of Patent: Jan. 17, 2012

(54) OPTICAL TRANSMITTING AND RECEIVING APPARATUS AND METHOD FOR ANALYZING ABNORMALITY OR FAILURE OF THE OPTICAL TRANSMITTING AND RECEIVING APPARATUS

(75) Inventor: Keita Hattori, Hitachinaka (JP)

(73) Assignee: Hitachi Cable, Ltd., Tokyo (JP)

( * ) Notice: Subject to any disclaimer, the term of this patent is extended or adjusted under 35 U.S.C. 154(b) by 597 days.

(21) Appl. No.: 12/255,949

(22) Filed: Oct. 22, 2008

(65) Prior Publication Data
US 2009/0148156 A1 Jun. 11, 2009

(30) Foreign Application Priority Data
Dec. 11, 2007 (JP) ................................. 2007-319894

(51) Int. Cl.
*H04B 10/08* (2006.01)
*H04B 17/00* (2006.01)
(52) U.S. Cl. ................ 398/22; 398/17; 398/23; 398/24; 398/25; 398/38
(58) Field of Classification Search .................. None
See application file for complete search history.

(56) References Cited

U.S. PATENT DOCUMENTS

| | | | | |
|---|---|---|---|---|
| 4,802,089 A * | 1/1989 | Shaw | ............................. | 711/156 |
| 4,870,439 A * | 9/1989 | Tsuboi et al. | .................... | 396/77 |
| 5,446,680 A * | 8/1995 | Sekiya et al. | .................. | 709/200 |
| 5,721,872 A * | 2/1998 | Katsuta | .......................... | 711/163 |
| 5,734,672 A | 3/1998 | McMinn et al. | | |
| 2002/0024691 A1 | 2/2002 | Kajita | | |
| 2007/0065151 A1 * | 3/2007 | Dybsetter et al. | ............. | 398/135 |

FOREIGN PATENT DOCUMENTS

| | | |
|---|---|---|
| EP | 1 096 625 A2 | 5/2001 |
| JP | 2002-240349 | 8/2002 |
| JP | 2005-85871 | 3/2005 |
| JP | 2005-94248 | 4/2005 |

\* cited by examiner

*Primary Examiner* — Kenneth N Vanderpuye
*Assistant Examiner* — Darren E Wolf
(74) *Attorney, Agent, or Firm* — Scully, Scott, Murphy & Presser, P.C.

(57) ABSTRACT

An optical transmitting and receiving apparatus 1 has a transmitting circuit unit 20 including a light emitting element 2 and a driving circuit 3 which drives the light emitting element 2, a receiving circuit unit 30 including a light receiving element 5 and amplification circuit 6 which amplifies a signal received from the light receiving element 5, a judging unit 8 which judges an abnormality or failure of either or both of the transmitting circuit unit 20 and the receiving circuit unit 30 based on a measured data value provided from the transmitting circuit unit 20 and/or the receiving circuit unit 30, and a measured value storing unit 9 which stores the measure data value in the case that the judging unit 8 judges the abnormality or failure occurs in the transmitting circuit unit 20 and/or the receiving circuit unit 30.

9 Claims, 6 Drawing Sheets

PRIOR ART

FIG.5

OPTICAL TRANSMITTING AND RECEIVING APPARATUS AND METHOD FOR ANALYZING ABNORMALITY OR FAILURE OF THE OPTICAL TRANSMITTING AND RECEIVING APPARATUS

The present application is based on Japanese Patent Application No. 2007-319894, the entire contents of which are incorporated herein by reference.

FIELD OF THE INVENTION

The present invention relates to an optical transmitting and receiving apparatus and a method for analyzing an abnormality or failure of the optical transmitting and receiving apparatus, in more particular, to an optical transmitting and receiving apparatus and a method for analyzing an abnormality or failure of the optical transmitting and receiving apparatus, by which it is possible to facilitate analysis of the abnormality or failure.

RELATED ART

In general, an optical transmitting and receiving apparatus is formed by accommodating a transmitting circuit unit including a light emitting element and a driving circuit, and a receiving circuit unit including a light receiving element and an amplification circuit in one housing, and is connected to a host apparatus for the use. Data to be transmitted to other communication apparatuses is sent from the host apparatus to the optical transmitting and receiving apparatus as an electrical signal. In the optical transmitting and receiving apparatus, this electrical signal is converted into an optical signal at the transmitting circuit unit for realizing an optical transmission. The optical signal transmitted from the other communication apparatus is converted into an electrical signal at the receiving circuit unit, and this electrical signal is sent to the host apparatus, so that data is received with host apparatus.

One of the conventional optical transmitting and receiving apparatuses comprises a judging unit which judges the abnormality or failure (hereinafter referred as "abnormality-failure") of the transmitting and receiving circuit unit from a value of a measured data obtained from the transmitting and receiving circuit, and a judgment result reporting unit which reports the judgment result of the abnormality-failure to a host apparatus. As described above, the optical transmitting and receiving apparatus has a self-diagnosis function, and a result thereof is reported to the host apparatus. Therefore, it is easy to control the optical transmitting and receiving apparatus in the host apparatus.

Figure 4:
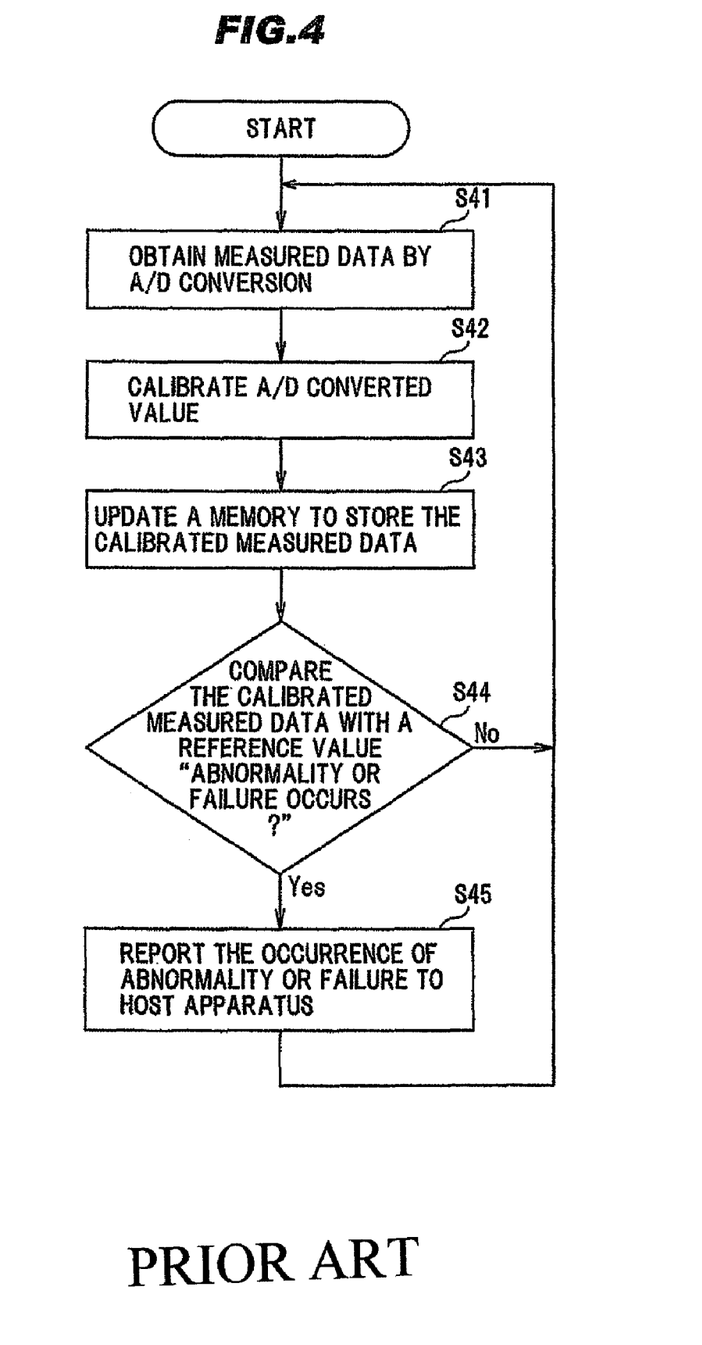
FIG. 4 is a flow chart showing an algorithm for judging an abnormality-failure judgment in a conventional optical transmitting and receiving apparatus.

FIG. 4 is a flow chart of an algorithm for judging the abnormality or failure in a conventional optical transmitting and receiving apparatus.

At the step S41, an analog measured data is converted into a digital value by an A/D (analog/digital) conversion. The measured data is, for example, an optical output power of a light emitting element which is received at a monitoring light receiving element and amplified.

At the step S42, the measured data expressed by the digital value after the A/D conversion is calibrated to correspond to a numeric value range that can be handled in the judging unit.

At the step S43, a formerly measured data (old measured data) is sequentially updated to a currently measured data (new measured data) by storing the calibrated measured data in a memory in the judging unit.

At the step S44, the judging unit carries out the judgment by comparing the measured data with a predetermined reference value stored in the memory. For example, a reference value corresponding to an upper limit of a required power is set for judging as to whether the optical output power is greater than the required power. When the measured data of the optical output power is greater than the reference value, it is judged that the abnormality-failure occurs. Alternatively, a reference value corresponding to a lower limit of the required power is set for judging that the optical output power is smaller than the required power. When the measured data of the optical output power is smaller than the reference value, it is judged that the abnormality-failure occurs.

If it is judged that there is no abnormality-failure at the step S44, the flow will be returned to the step S41, and the diagnosis is continued. If it is judged that the abnormality-failure occurs at the step S44, the flow will be proceeded to step S45. At the step S45, a judgment result reporting unit reports the occurrence of the abnormality-failure to the host apparatus.

The conventional optical transmitting and receiving apparatuses are disclosed by for example Japanese Patent Laid-Open No. 2002-240349 (JP-A-2002-240349), Japanese Patent Laid-Open No. 2005-94248 (JP-A-2005-94248), Japanese Patent Laid-Open No. 2002-76506 (JP-A-2002-76506), and Japanese Patent Laid-Open No. 2005-85871 (JP-A-2005-85871).

However, the conventional optical transmitting and receiving apparatus merely reports to the host apparatus the occurrence of the abnormality-failure, so that the host apparatus only recognizes the phenomenon that a certain abnormality-failure occurred in the optical transmitting and receiving apparatus. In addition, when a manufacturing operator starts maintenance of the optical transmitting and receiving apparatus based on this reporting, the abnormality-failure is not always reproducible. Therefore, it is impossible to grasp the situation of the occurrence of the abnormality-failure. Even more particularly, it is impossible to record the situation of the occurrence of the abnormality-failure, so as to report a manufacturer of the optical transmitting and receiving apparatus.

The Inventors of the present invention contemplated that it will be possible to grasp the situation of the occurrence of the abnormality-failure at the time of the maintenance and to report the situation of the occurrence of the abnormality-failure to the manufacturer of the optical transmitting and receiving apparatus, in order to discuss how to deal the abnormality-failure and to find the improvable point of the product, if the situation of the occurrence of the abnormality-failure is recorded.

SUMMARY OF THE INVENTION

Therefore, an object of the present invention is to provide an optical transmitting and receiving apparatus and a method for analyzing an abnormality or failure of the optical transmitting and receiving apparatus, which facilitates the analysis of the abnormality or failure.

According to a feature of the invention, an optical transmitting and receiving apparatus comprises:

a transmitting circuit unit comprising a light emitting element and a driving circuit which drives the light emitting element;

a receiving circuit unit comprising a light receiving element and an amplification circuit which amplifies a signal received at the light receiving element;

a judging unit which judges an occurrence of an abnormality or failure of at least one of the transmitting circuit unit and the receiving circuit unit based on a value of a measured data obtained from the transmitting circuit unit and the receiving circuit unit; and a measured data storing unit which stores the value of the measured data when the judging unit judges that the abnormality or failure occurs in at least one of the transmitting circuit unit and the receiving circuit unit.

In the optical transmitting and receiving apparatus, the judging unit may comprise an A/D converter which converts the value of the measured data obtained from the transmitting circuit unit and the receiving circuit unit into a digital value, and a digital comparator which compares the digital value of the measured data with a digital reference value for judgment and outputs a binary digital judgment value indicating a state of the abnormality or failure or a normal state.

In the optical transmitting and receiving apparatus, the judging unit may comprise a comparator which compares the value of the measured data with an analog reference value for judgment and outputs a binary digital judgment value indicating a state of the abnormality or failure or a normal state.

The optical transmitting and receiving apparatus may further comprise:

a judgment result reporting unit which reports a judgment result of the abnormality or failure to a host apparatus.

The optical transmitting and receiving apparatus may further comprise:

a measured value supplying unit which provides a host apparatus with the value of the measured data when the abnormality or failure occurs which is stored in the measured value storing unit.

In the optical transmitting and receiving apparatus, the measured value storing unit may hold the value of the measured data at the occurrence of the abnormality or failure until the measured value supplying unit supplies the value of the measured data to the host apparatus, and release a hold of the value of the measured data when the value of the measured data is supplied to the host apparatus.

In the optical transmitting and receiving apparatus, the measured data may comprise at least one of an optical output power obtained by amplifying an optical output of the light emitting element received at a monitoring light receiving element, a bias current applied to the light emitting element, an optical input power obtained from the amplification circuit for the light receiving element, and a bias voltage applied to the light receiving element.

The optical transmitting and receiving apparatus may further comprise:

a judgment stop command receiving unit which stops the judgment in the judging unit in response to a command for stopping the judgment in the judging unit from a host apparatus.

According to another feature of the invention, a method for analyzing an abnormality or failure of an optical transmitting and receiving apparatus comprises:

obtaining a measured data from a transmitting circuit unit and a receiving circuit unit;

judging an occurrence of the abnormality or failure of at least one of the transmitting circuit unit and the receiving circuit unit based on a value of the measured data;

storing a value of the measured data when it is judged that the malfunction or failure occurs in at least one of the transmitting circuit unit and the receiving circuit unit; and supplying the value of the stored measured data to a host apparatus when requested from the host apparatus.

The method for analyzing the abnormality or failure of the optical transmitting and receiving apparatus may further comprise:

setting an abnormality or failure reporting flag indicating that the measured data at an occurrence of the abnormality or failure is stored; and clearing the abnormality or failure reporting flag when the stored measured data is retrieved by the host apparatus.

EFFECTS OF THE INVENTION

According to the present invention, following excellent effect can be obtained.

(1) It is possible to facilitate the analysis of the abnormality or failure of the optical transmitting and receiving apparatus.

BRIEF DESCRIPTION OF THE DRAWINGS

Next, preferred embodiments according to the present invention will be explained in conjunction with appended drawings, wherein.

DETAILED DESCRIPTION OF PREFERRED EMBODIMENTS

Next, preferred embodiments according to the present invention will be explained in more detail in conjunction with the appended drawings.

First Preferred Embodiment

Figure 1A:
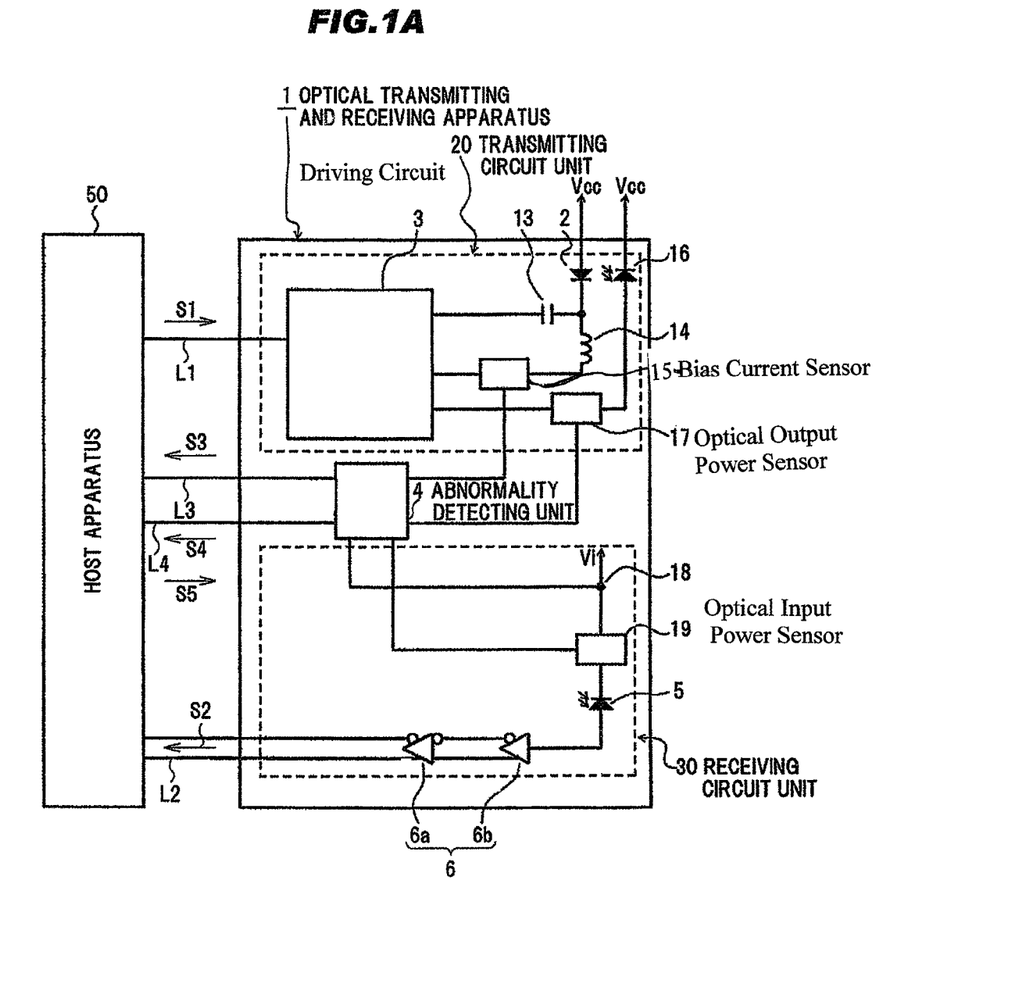
FIG. 1A is a schematic circuitry diagram of an optical transmitting and receiving apparatus in a first preferred embodiment according to the present invention.
Figure 1B:
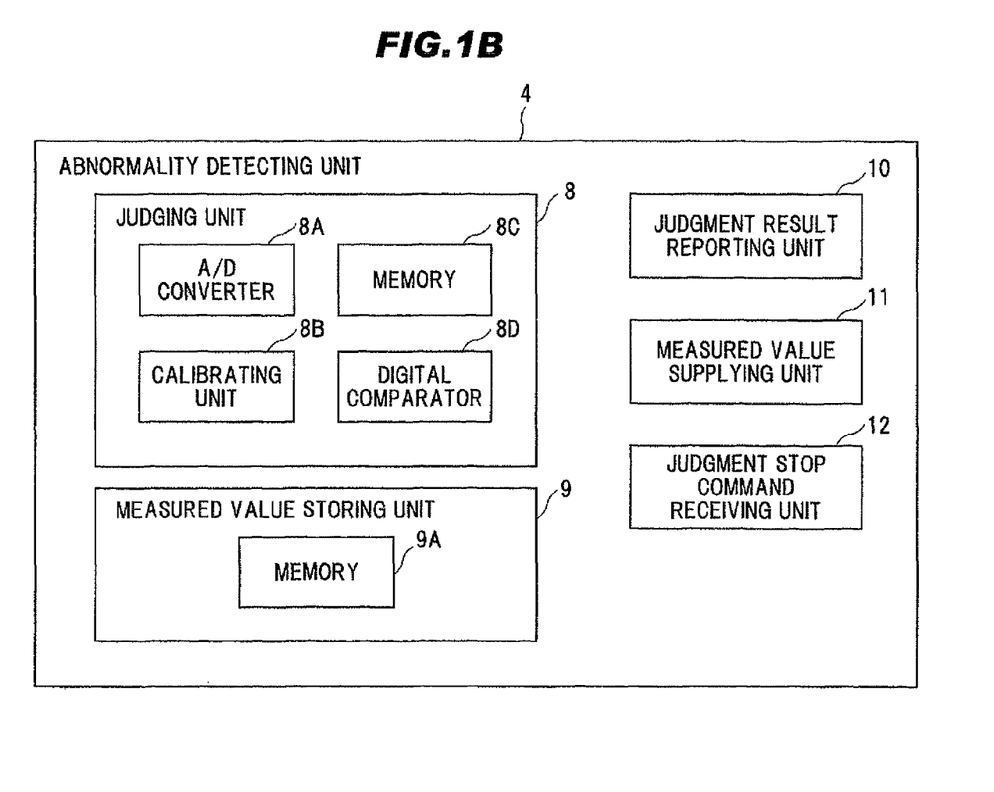
FIG. 1B is a schematic block diagram of an abnormality detecting unit in the optical transmitting and receiving apparatus in the first preferred embodiment.
Figure 1C:
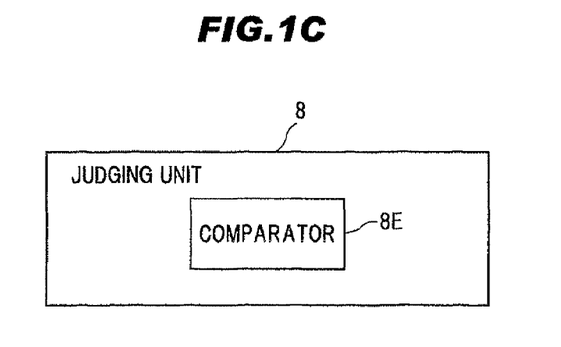
FIG. 1C is a schematic block diagram of an abnormality detecting unit in the optical transmitting and receiving apparatus in a variation of the first preferred embodiment.

FIG. 1A is a schematic circuitry diagram of an optical transmitting and receiving apparatus in a first preferred embodiment according to the present invention, FIG. 1B is a schematic block diagram of an abnormality detecting unit in the optical transmitting and receiving apparatus in the first preferred embodiment, and FIG. 1C is a schematic block diagram of an abnormality detecting unit in the optical transmitting and receiving apparatus in a variation of the first preferred embodiment.

As shown in FIG. 1A, an optical transmitting and receiving apparatus 1 comprises a transmitting circuit unit 20 comprising a light emitting element 2 and a driving circuit 3 which drives the light emitting element 2, a receiving circuit unit 30 comprising a light receiving element 5 and amplification circuit 6 which amplifies a signal received from the light receiving element 5, and an abnormality detecting unit 4. As shown in FIG. 1B, the abnormality detecting unit 4 comprises a judging unit 8 which judges an abnormality-failure of either or both of the transmitting circuit unit 20 and the receiving circuit unit 30 based on a measured data value provided from the transmitting circuit unit 20 and/or the receiving circuit unit 30, and a measured value storing unit 9 which stores the measure data value in the case that the judging unit 8 judges the abnormality-failure occurs in the transmitting circuit unit 20 and/or the receiving circuit unit 30.

In this preferred embodiment, functions of the circuits such as the judging unit 8, the measured value storing unit 9 and the like are realized by providing a micro computer unit (MCU).

The abnormality detecting unit 4 further comprises a judgment result reporting unit 10 which reports a judgment result of the abnormality-failure to a host apparatus 50, a measured value supplying unit 11 which provides the host apparatus 50 with the measured data when the abnormality-failure occurs which is stored in the measured value storing unit 9, and a judgment stop command receiving unit 12 which receives a command to stop the judgment in the judging unit 8 from the host apparatus 50.

The judgment result reporting unit 10 comprises a logic output circuit such as Transistor Transistor Logic (TTL) or Complementary Metal-Oxide Semiconductor (CMOS). The judgment result reporting unit 10 for example outputs a "Low" level signal at a normal state and a "High" level signal at the occurrence of the abnormality-failure as a voltage value.

As shown in FIG. 13, the judging unit 8 comprises an A/D converter 8A which converts an analog signal indicating the measured data into a digital signal by A/D conversion, a calibrating unit 8B which calibrates the digital signal into a signal corresponding to a numerical range operable by the judging unit 8, a memory 8C which stores the calibrated signal and a digital reference value for judging the abnormality-failure, and a digital comparator 8D which compares the digital value of the measured data with the stored digital reference value to judge as to whether the abnormality-failure occurs.

The light emitting element 2 for example comprises a laser diode (LD), and the driving circuit 3 for example comprises a laser driver.

The transmitting circuit unit 20 further comprises a capacitor 13 which applies a high frequency driving signal to the light emitting element 2, an inductor 14 which applies a bias current to the light emitting element 2, a bias current sensor 15 which detects the bias current, a monitoring light receiving element 16 which monitors a light emitted from the light emitting element 2, and an optical output power sensor 17 which detects a received light current by amplification.

The light receiving element 5 comprises for example a photodiode (PD).

The receiving circuit unit 30 comprises a bias voltage sensor 18 which detects the bias voltage, an optical input power sensor 19 which monitors the received light current of the light receiving element 5 for data measurement, and the amplification unit 6 comprising a pre-amplification circuit 6a and a post-amplification circuit 6b, each of which amplifies the received light current in the light receiving element 5 for the purpose of communication.

The bias voltage sensor 18 may be structured as shown in FIG. 1A, in which a bias voltage Vi is directly connected to a port to the abnormality detecting unit 4 and a bias voltage value is read at the A/D converter 8A in the abnormality detecting unit 4. Alternatively, a voltage proportional to the bias voltage Vi may be input to the abnormality detecting unit 4.

Figure 5:
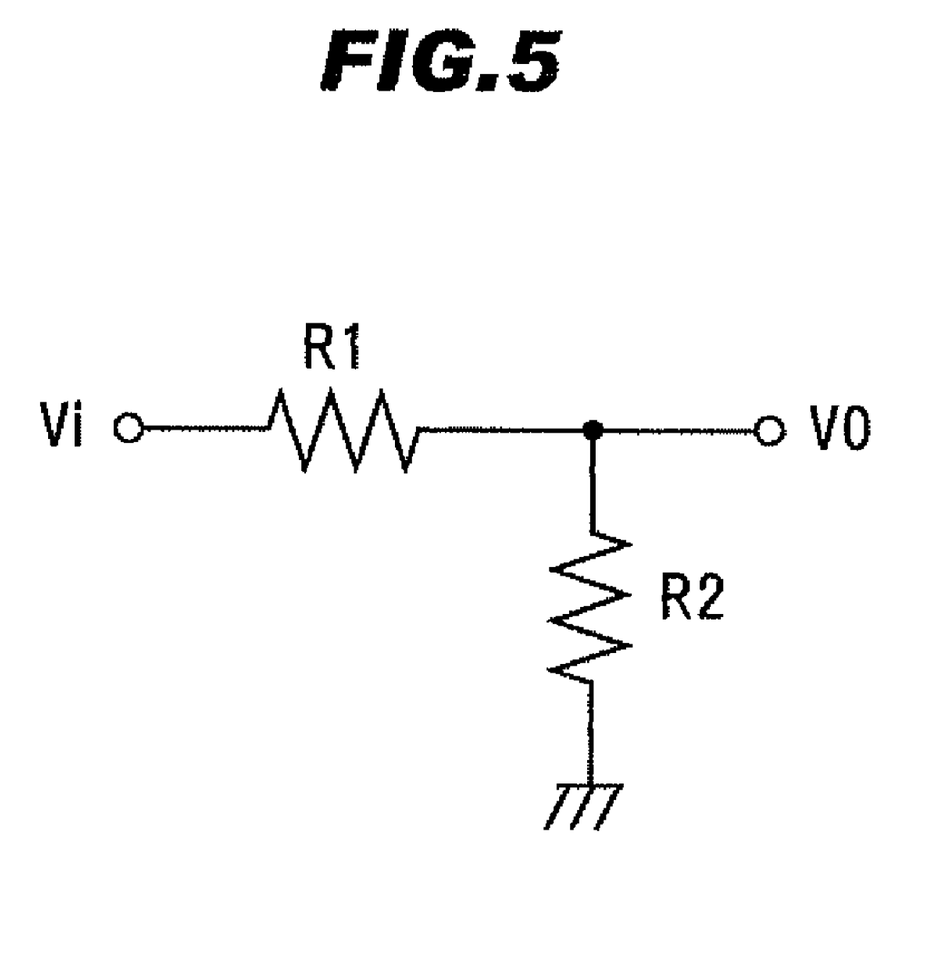
FIG. 5 is a schematic circuitry diagram of a DC voltage attenuator used in the optical transmitting and receiving apparatus in the preferred embodiments according to the present invention.

In this structure, an attenuator for DC voltage shown in FIG. 5 may be used. A monitoring voltage $V_0$ is calculated from a following equation by using the bias voltage Vi and resistances R1, R2:

$$V_0 = \frac{R_2}{R_1 + R_2} \times V_i$$

As described above, in this preferred embodiment, an optical output power obtained by amplifying an output of the light emitting element 2 received at the monitoring light receiving element 16, the bias current applied to the light emitting element 2, an optical input power obtained from the amplification circuit 6 for the light receiving element 5, and the bias voltage Vi applied to the light emitting element 2 are used as the measured data.

In this preferred embodiment, these measured data are analog signals. An analog value of each of the analog signals is converted into the digital value in the A/D converter 8A in the abnormality detecting unit 4 for an appropriate clock time increment (for example, at a time interval of 0.1 msec to 10 msec), and stored in the memory 8C in the judging unit 8 in the abnormality detecting unit 4.

Between the optical transmitting and receiving apparatus 1 and the host apparatus 50, electric transmission paths L1, L2 for a transmitting high frequency transmission signals S1, S2 respectively, an electric transmission path L3 for transmitting an abnormality-failure reporting signal S3, and a serial signal bus L4 for transmitting signals S4, S5 for other information such as a measured data requesting signal and a measured data reporting signal are provided.

Next, an operation of optical transmitting and receiving apparatus 1 will be explained below.

An operation of the communication in the optical transmitting and receiving apparatus 1 is similar to that in the conventional optical transmitting and receiving apparatus. Therefore, the operation of the communication is explained briefly.

The high frequency transmission signal S1 is input to the transmitting circuit unit 20 from the host apparatus 50 via the electric transmission path L1, and the driving circuit 3 applies a required current to the light emitting element 2 in response to the high frequency transmission signal S1. An optical signal emitted from the light emitting element 2 is transmitted to another communication apparatus via an optical transmission path (not shown).

An optical signal transmitted from the other communication apparatus is input to the light receiving element 5 via the optical transmission path (not shown). The received light current generated by the light received at the light receiving element 5 is amplified in the pre-amplification circuit 6a and the post-amplification circuit 6b, to provide the high frequency transmission signal S2. This high frequency transmission signal S2 is output to the host apparatus 50 via the electric transmission path L2.

Next, an operation of judging the abnormality-failure in the first preferred embodiment will be explained with referring to FIG. 2.

Figure 2:
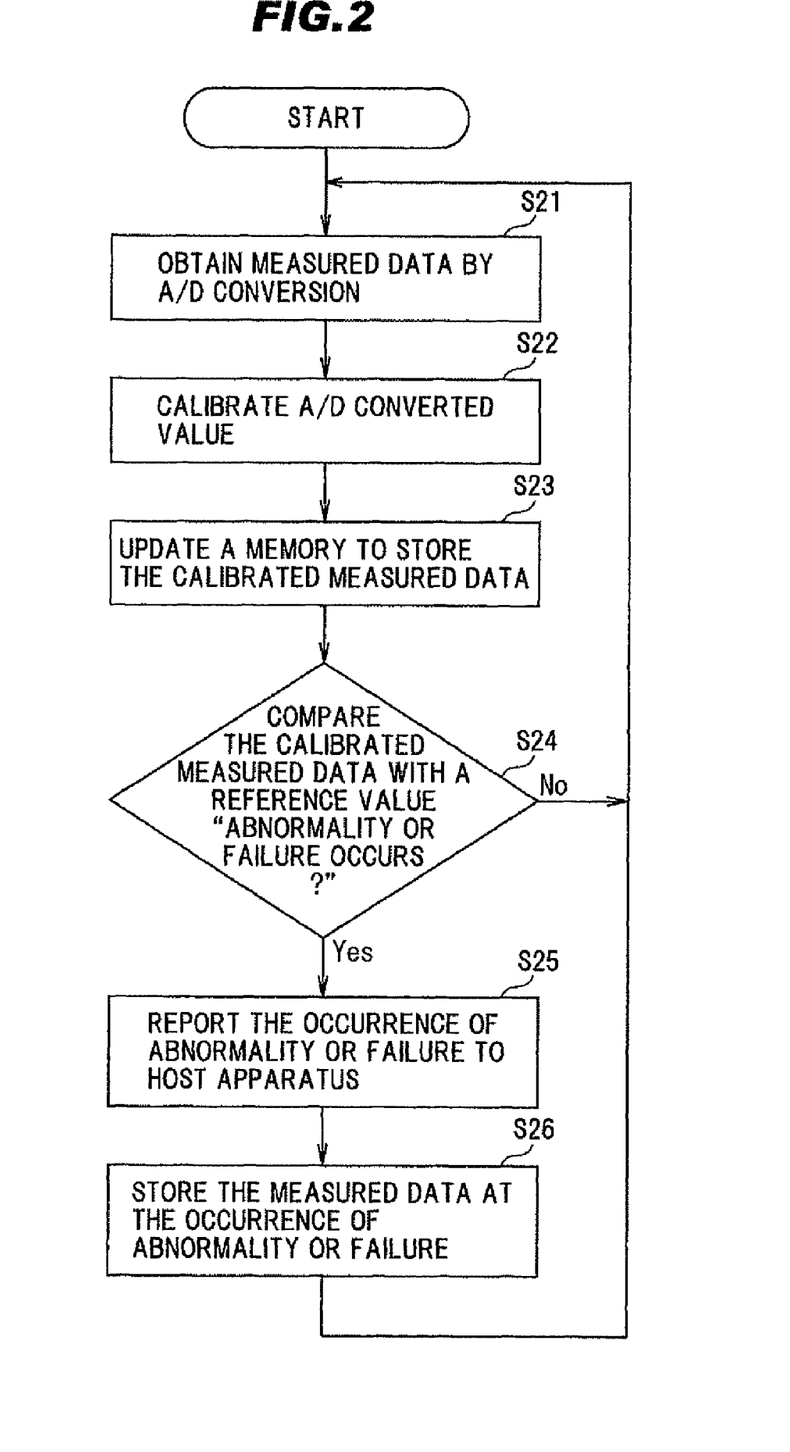
FIG. 2 is a flow chart showing an algorithm for judging an abnormality-failure in the first preferred embodiment according to the present invention.

FIG. 2 is a flow chart showing an algorithm for judging an abnormality-failure in the first preferred embodiment according to the present invention.

As shown in FIG. 2, at the step S21, the A/D converter 8A in the abnormality detecting unit 4 converts the analog value of the measured data (the measured value) into the digital value by A/D conversion. Herein, the "measured data" means the aforementioned optical output power, bias current, optical input power, bias voltage and the like, and the algorithm shown in FIG. 2 is applied to all of these measurement data.

At the step S22, the calibrating unit 8B in the judging unit 8 calibrates the measured data (the measured value) converted into the digital value by the A/D conversion to correspond to the numerical range operable by the judging unit 8.

At the step S23, the calibrated measured data is stored in the memory 8C in the judging unit 8, to update formerly measured data to currently measured data sequentially.

At the step S24, the digital comparator 8D in the judging unit 8 compares the measured data stored in the memory 8C with the reference value previously set and stored in the memory 8C, to judge as to whether the abnormality-failure occurs. For example, in the case of judging as to whether the optical output power is greater than a required optical output power, the reference value is set to an upper limit of the required output power. When the measured data of the optical output power exceeds the reference value, it is judged that the abnormality-failure occurred. Alternatively, in the case of judging as to whether the optical output power is smaller than the required optical output power, the reference value is set to a lower limit of the required output power. When the measured data of the optical output power is less than the reference value, it is judged that the abnormality-failure occurs.

If the judging unit 8 judges that no abnormality-failure occurs at the step S24, the flow will be returned to the step S21 and the optical transmitting and receiving apparatus 1 will continue the diagnosis at the step S21. If the judging unit 8 judges that the abnormality-failure occurs at the step S24, the flow will proceed to the step S25.

At the step S25, the judgment result reporting unit 10 reports the occurrence of the abnormality-failure to the host apparatus 50 by the abnormality-failure reporting signal S3 indicating the voltage value is at the "High" level.

Further, in the present invention, the flow is proceeded to step S26.

At the step S26, the measured value storing unit 9 stores the measured data (the measured value) at the time of the occurrence of the abnormality-failure in a memory 9A that is provided in a region different from that of the memory 8C in which the calibrated data is stored at the step S23.

In response to this operation, the host apparatus 50 recognizes that the abnormality-failure occurred in the optical transmitting and receiving apparatus 1. The host apparatus 50 displays the occurrence of the abnormality-failure on a panel of the host apparatus 50, and/or report the occurrence of the abnormality-failure to a managing terminal connected to the host apparatus 50 via a transmission path. Then, a manufacturing operator operates the host apparatus 50 to request the value of the measured data to the optical transmitting and receiving apparatus 1. In response to the request from the host apparatus 50, the measured value supplying unit 11 of the optical transmitting and receiving apparatus 1 provides the value of the measured data at the time of the occurrence of the abnormality-failure stored in the memory 9A in the measured value storing unit 9. The request of the measured value and the response to the request may be carried out via the serial signal bus L4.

For example, the measured data requesting signal S4 may be transmitted from the host apparatus 50 to the measured value supplying unit 11. In response, the measured data reporting signal S5 may be transmitted from the measured value supplying unit 11 to the host apparatus 50.

When the host apparatus 50 notifies a command of stopping or prohibiting the abnormality-failure judgment to the optical transmitting and receiving apparatus 1, the judgment stop command receiving unit 12 of the optical transmitting and receiving apparatus 1 receives the command of stopping or prohibiting the abnormality-failure judgment via the serial signal bus L4. Then, the judgment stop command receiving unit 12 stops the operation of the judging unit 8, or prohibits the judgment result reporting unit 10 from reporting the judgment result of the judging unit 8 to the host apparatus 50.

The judgment result reporting unit 10 comprising the TTL or CMOS outputs the "Low" level at the normal state and the "High" level at the occurrence of the abnormality-failure as the voltage value.

As explained above, in the present invention, the optical transmitting and receiving apparatus 1 stores the measured value at the occurrence of the abnormality-failure. Since the host apparatus 50 can retrieve the measured value, the manufacturing operator can well grasp the situation in the occurrence of the abnormality-failure well when the manufacturing operator starts the maintenance of the optical transmitting and receiving apparatus 1. In addition, such measured value of the abnormality-failure may be used for reporting the abnormality-failure situation to a manufacturer of the optical transmitting and receiving apparatus, so as to discuss how to deal the abnormality-failure, and discovering the points to be improved of the product. For example, it is possible to use the measure data for analyzing as to whether the reference value for the abnormality-failure judgment is appropriate.

In this preferred embodiment, the judging unit 8 in the abnormality detecting unit 4 may be realized by the MCU which comprises the A/D converter 8A, the calibration unit 8B, the memory 8C, and the digital comparator 8D. However, the present invention is not limited thereto.

As shown in FIG. 1C, the judging unit 8 may comprise a comparator 8E which compares the analog value of the measured data obtained from the transmitting circuit unit 20 and the receiving circuit unit 30 with an analog reference value for the abnormality-failure judgment, and outputs a binary digital judgment value indicating the occurrence of the abnormality-failure, or the normal state.

Alternatively, as shown in FIG. 1B, the judging unit 8 may comprise the A/D converter 8A which converts the analog value of the measured data obtained from the transmitting circuit unit 20 and the receiving circuit unit 30 with the digital reference value for the abnormality-failure judgment, and the digital comparator 8D which compares the digital value of the measured data with the digital reference value for the abnormality-failure judgment and outputs a binary digital judgment value indicating the occurrence of the abnormality-failure, or the normal state.

Second Preferred Embodiment

Next, an operation of judging the abnormality-failure in the second preferred embodiment will be explained with referring to FIG. 3.

Figure 3:
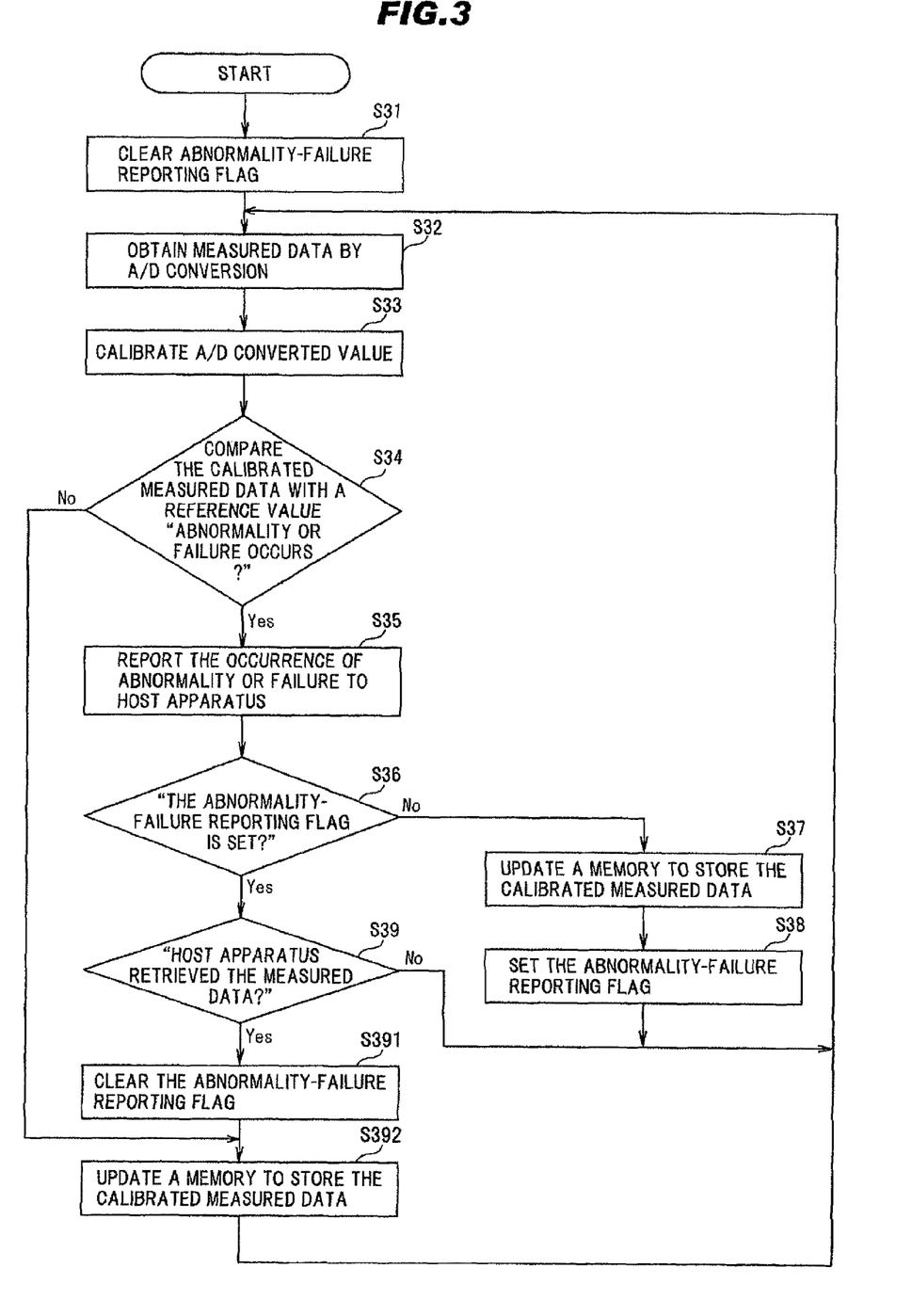
FIG. 3 is a flow chart showing an algorithm for judging an abnormality-failure judgment in a second preferred embodiment according to the present invention.

FIG. 3 is a flow chart showing an algorithm for judging an abnormality-failure judgment in another preferred embodiment according to the present invention.

As shown in FIG. 3, at the step S31, the abnormality detecting unit 4 clears an abnormality-failure reporting flag stored in the memory 9A. The abnormality-failure reporting flag is a flag indicating that there is the measured value at the occurrence of the abnormality-failure to be provided to the host apparatus 50 and that the measured value at the occurrence of the abnormality-failure is not yet retrieved by the host apparatus 50. The step S31 is carried out to initialize the algorithm shown in FIG. 3.

At the step S32, the A/D converter 8A in the judging unit 8 in the abnormality detecting unit 4 obtains the digital value by converting the analog value of the measured data (the measured value) into the digital value by A/D conversion, similarly to the step S21 in FIG. 2.

At the step S33, the calibrating unit 8B in the judging unit 8 calibrates the measured data (the measured value) converted into the digital value by the A/D conversion, similarly to the step S22.

At the step S34, the digital comparator 8D in the judging unit 8 compares the measured data stored in the memory 8C with the reference value, to judge as to whether the abnormality-failure occurs, similarly to the step S24.

If the judging unit 8 judges that no abnormality-failure occurs at the step S34, the flow will proceed to the step S392. If the judging unit 8 judges that the abnormality-failure occurs at the step S34, the flow will be proceeded to step S35.

At the step S35, the judgment result reporting unit 10 reports the occurrence of the abnormality-failure to the host apparatus 50 by the abnormality-failure reporting signal S3.

At the step S36, the judging unit 8 in the abnormality detecting unit 4 judges as to whether the abnormality-failure reporting flag is set or not. If the judging unit 8 judges that the abnormality-failure reporting flag is already set at the step S36, the flow will proceed to the step S39. If the judging unit 8 judges that the abnormality-failure reporting flag is not yet set at the step S36, the flow will proceed to the step S37. Namely, the flow proceeds to the step S37 just after the abnormality-failure occurs.

At the step S37, the calibrated measured data is stored in the memory 9A in the measured value storing unit 9, to update the formerly measured data to the currently measured data sequentially. Therefore, at the step S37, the measured data at the occurrence of the abnormality-failure for this time is stored.

At the step S38, the measured value supplying unit 11 of the abnormality detecting unit 4 sets the abnormality-failure reporting flag and the flow is returned to the step S32.

Since the abnormality-failure reporting flag is set, the judging unit 8 judges that the abnormality-failure reporting flag is already set at the step S36. As a result, the flow proceeds to the step S39.

At the step S39, a confirmation flag indicating that the host apparatus 50 has retrieved the measured data at the occurrence of the abnormality-failure in another task (not shown) is set. The judging unit 8 of the abnormality detecting unit 4 judges as to whether the host apparatus 50 retrieved the measured data at the occurrence of the abnormality-failure based on the confirmation flag.

If it is judged that the measured data at the occurrence of the abnormality-failure is not retrieved yet at the step S39, the flow will return to the step S32. In this flow, the state that the abnormality-failure reporting flag is set is maintained. As a result, the measured data at the occurrence of the abnormality-failure is maintained.

If it is judged that the measured data at the occurrence of the abnormality-failure is already retrieved at the step S39, the flow will proceed to the step S391.

At the step S391, the abnormality detecting unit 4 clears the abnormality-failure reporting flag. This step corresponds to an admission of the flow from the step S36 to the step S37. Therefore, the measured data at the occurrence of the abnormality-failure is made rewritable. In other words, this flow means the release of a hold of the measured data at the occurrence of the abnormality-failure.

At the step S392, the calibrated measured data is stored in the memory 8C in the judging unit 8, to update the formerly measured data to the currently measured data sequentially.

In the second preferred embodiment, the measured value storing unit 9 holds the value of the measured data at the occurrence of the abnormality-failure, until the measured value supplying unit 11 provides the value of the measured data at the occurrence of the abnormality-failure to the host apparatus 50. When the value of the measured data at the occurrence of the abnormality-failure is provided to the host apparatus 50, the hold of the measured date is released.

According to this structure, the value of the measured data at the occurrence of the abnormality-failure is securely provided to the host apparatus 50.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. An optical transmitting and receiving apparatus comprising:
   a transmitting circuit unit comprising a light emitting element and a driving circuit which drives the light emitting element;
   a receiving circuit unit comprising a light receiving element and an amplification circuit which amplifies a signal received at the light receiving element; and
   an abnormality detecting unit having a judging unit which judges an occurrence of an abnormality or failure of at least one of the transmitting circuit unit and the receiving circuit unit based on a current value of a measured data obtained from the transmitting circuit unit and the receiving circuit unit and a measured data storing unit which stores a value of the measured data when the judging unit judges that the abnormality or failure occurs in at least one of the transmitting circuit unit and the receiving circuit unit,
   wherein, when the judging unit judges that the abnormality or failure occurs, the judging unit judges whether an abnormality-failure reporting flag is set or not,
   if the judging unit judges that the abnormality-failure reporting flag is already set,
      the abnormality detecting unit clears the abnormality-failure reporting flag and rewrites the current value of the measured data as the value of the measured data when the judging unit judges that the abnormality or failure occurs in the measured data storing unit, when the judging unit judges, based upon a confirmation flag, that a host apparatus has already retrieved the value of the measured data stored in the measured data storing unit, and
      the abnormality detecting unit maintains a set state for the abnormality-failure reporting flag, and maintains the value of the measured data stored in the measured data storing unit without storing the current value of the measured data in the measured data storing unit, when the judging unit judges, based on the confirmation flag, that the host apparatus has not retrieved the value of the measured data stored in the measured data storing unit, and
   if the judging unit judges that the abnormality-failure reporting flag is not set,
      the abnormality detecting unit stores the current value of the measured data as the value of the measured data in the measured data storing unit when the judging unit judges that the abnormality or failure occurs, and sets the abnormality-failure reporting flag.

2. The optical transmitting and receiving apparatus, according to claim 1, wherein the judging unit comprises an A/D converter which converts the current value of the measured data obtained from the transmitting circuit unit and the receiving circuit unit into a digital value, and a digital comparator which compares the digital value of the measured data with a digital reference value for judgment and outputs a binary digital judgment value indicating a state of the abnormality or failure or a normal state.

3. The optical transmitting and receiving apparatus, according to claim 1, wherein the judging unit comprises a comparator which compares the current value of the measured data with an analog reference value for judgment and outputs a binary digital judgment value indicating a state of the abnormality or failure or a normal state.

4. The optical transmitting and receiving apparatus, according to claim 1, further comprising:
a judgment result reporting unit which reports a judgment result of the abnormality or failure to a host apparatus.

5. The optical transmitting and receiving apparatus, according to claim 1, further comprising: a measured value supplying unit which provides a host apparatus with the value of the measured data when the abnormality or failure occurs which is stored in the measured data storing unit.

6. The optical transmitting and receiving apparatus, according to claim 5, wherein the measured data storing unit holds the value of the measured data at the occurrence of the abnormality or failure until the measured value supplying unit supplies the value of the measured data to the host apparatus, and releases a hold of the value of the measured data when the value of the measured data is supplied to the host apparatus.

7. The optical transmitting and receiving apparatus, according to claim 1, wherein the measured data comprises at least one of an optical output power obtained by amplifying an optical output of the light emitting element received at a monitoring light receiving element, a bias current applied to the light emitting element, an optical input power obtained from the amplification circuit for the light receiving element, and a bias voltage applied to the light receiving element.

8. The optical transmitting and receiving apparatus, according to claim 1, further comprising:
a judgment stop command receiving unit which stops the judgment in the judging unit in response to a command for stopping the judgment in the judging unit from a host apparatus.

9. A method for analyzing an abnormality or failure of an optical transmitting and receiving apparatus comprising:
obtaining a measured data from a transmitting circuit unit and a receiving circuit unit;
judging an occurrence of the abnormality or failure of at least one of the transmitting circuit unit and the receiving circuit unit based on a current value of the measured data by an abnormality detecting unit having a judging unit and a measured data storing unit;
storing a value of the measured data when it is judged that the abnormality or failure occurs in at least one of the transmitting circuit unit and the receiving circuit unit in the measured data storing unit of the abnormality detecting unit; and
supplying the value of the stored measured data to a host apparatus when requested from the host apparatus,.
wherein, when the judging unit judges that the abnormality or failure occurs, the judging unit judges whether the abnormality-failure reporting flag is set or not,
if the judging unit judges that the abnormality-failure reporting flag is already set and when the judging unit judges, based upon a confirmation flag, that a host apparatus has already retrieved the value of the measured data stored in the measured data storing unit, the method further comprises:
clearing the abnormality-failure reporting flag; and
rewriting the current value of the measured data as the value of the measured data when the judging unit judges that the abnormality or failure occurs in the measured data storing unit,
if the judging unit judges that the abnormality-failure reporting flag is already set and when the judging unit judges, based on the confirmation flag, that the host apparatus has not retrieved the value of the measured data stored in the measured data storing unit, the method further comprises:
maintaining a set state for the abnormality-failure reporting flag; and
maintaining the value of the measured data stored in the measured data storing unit without storing the current value of the measured data in the measured data storing unit, and
if the judging unit judges that the abnormality-failure reporting flag is not set, the method further comprises:
storing the current value of the measured data as the value of the measured data in the measured data storing unit when the judging unit judges that the abnormality or failure occurs; and
setting the abnormality-failure reporting flag.

* * * * *